United States Patent Office 3,265,656
Patented August 9, 1966

3,265,656
HIGH ACRYLONITRILE POLYMER SOLUTIONS CONTAINING POLYEPIHALOHYDRINS
Fred J. Lowes, Jr., Midland, Mich., assignor to The Dow Chemical Company, Midland, Mich., a corporation of Delaware
No Drawing. Filed Dec. 11, 1963, Ser. No. 329,902
6 Claims. (Cl. 260—29.6)

This invention relates to compositions of matter that are especially adapted for use in spinning acrylonitrile polymer synthetic textile fibers or the like structures. It relates more particularly to spinnable solutions of such polymers in concentrated aqueous salt solutions having certain polyepihalohydrins dispersed therein. The invention is also concerned with shaped articles, especially filamentary structures having increased flexibility and to methods for the preparation of such compositions and articles.

This application is a continuation-in-part of application Serial No. 158,594, filed December 11, 1961, now abandoned.

The expression "polyepihalohydrins" as used herein refers to those polymers of epichlorohydrin or epibromohydrin having terminal hydroxyl groups and halomethyl side chains, which polymers are essentially devoid of functional epoxy groups.

Polyacrylonitrile and many of the fiber and film-forming copolymers of acrylonitrile may advantageously be fabricated by a wet spinning process wherein the polymer composition is extruded from compositions of the polymer in polyacrylonitrile-dissolving aqueous saline solvents, particularly aqueous solutions of zinc chloride and its saline equivalents. Such a procedure, as is well known in the art, is oftentimes referred to as salt-spinning with the fiber (or other shaped articles) obtained thereby being salt-spun. In salt-spinning, the fiber-forming aqueous saline spinning solution or other composition of the polymer is extruded during the spinning operation into a non-polymer dissolving coagulation liquid, or spin bath, which frequently is a solution of the same salt or salts as are in the spinning solution.

Acrylonitrile polymers (including fiber-forming copolymers), particularly polyacrylonitrile, that are salt-spun in the referred-to manner are generally formed initially as aquagel intermediates. Such intermediates have a water-swollen or hydrated structure prior to their being finally irreversibly dried to the desired, characteristically hydrophobic, product.

Advantageously, the aquagel structure of polyacrylonitrile and other fiber and film forming acrylonitrile polymers may be derived by the extrusion into and coagulation in an aqueous coagulating spin bath of a solution of the acrylonitrile polymer that is dissolved in an aqueous zinc chloride saline solvent therefor. It is usually desirable for zinc chloride to be at least the principal (if not the entire) saline solute in the aqueous saline solvent solution.

If preferred, however, various of the saline equivalents for zinc chloride may also be employed in the aqueous saline solvent medium for the spinning solution and the coagulating bath utilized. Those zinc chloride equivalents, as is well known, include various of the thiocyanates (such as calcium thiocyanate), lithium bromide and the salts and salt mixtures that are "solvent" members of the so-called "lyotropic" series as are disclosed among other places in U.S. 2,140,921, 2,425,192, 2,648,592, 2,648,593, 2,648,646, 2,648,648, and 2,648,649.

Fabricated acrylonitrile polymer films, fibers and like filamentous articles derived from salt-spinning processes are generically described as capable of lying substantially in a single plane, having at least one major dimension, and at least one minor dimension less than about 0.1 inch, said articles being characterized by having orientation of the molecules parallel to one another and to a major surface of the article. Such articles are often hard and brittle and have a tendency to crack or break during preparation and subsequent normal usage of the shaped article.

There is still a need for a non-volatile and economically practical plasticizer to impart permanent flexibility with accompanying ease of formation to shaped articles produced from salt-spun acrylonitrile polymers.

Accordingly, it is the primary object of the present invention to provide compositions of matter especially adapted for use in spinning synthetic films or like structures comprising solutions of high acrylonitrile polymers, (i.e., those containing at least 85 weight percent of polymerized acrylonitrile in the polymer molecule).

A further object is to provide shaped articles from the compositions of the invention which have increased flexibility.

A still further object is to provide a method of producing the composition and articles of the present invention.

Other and related objects will become evident from the following specification and claims.

In accordance with the present invention, high acrylonitrile synthetic articles, having increased flexibility, are produced from a polymeric spinning solution comprising an acrylonitrile polymer selected from the group consisting of polyacrylonitrile and interpolymers of acrylonitrile containing in the polymer molecule at least about 85 weight percent of acrylonitrile, the balance being at least one other monoethylenically unsaturated monomeric material that is copolymerizable with acrylonitrile; wherein such polymer is dissolved in an aqueous solvent solution, preferably where zinc chloride is the principal (if not entire) saline solute, and wherein the aqueous saline solvent has additionally dissolved therein between about 5 weight percent and about 25 weight percent, preferably between about 5 weight percent and 15 weight percent of the acrylonitrile polymer of at least one essentially water-insoluble polyepihalohydrin (as hereinafter defined).

The acrylonitrile polymer employed in practice of the present invention is, advantageously, polyacrylonitrile, although, as is readily apparent, any of the well-known fiber and film-forming copolymers thereof that contain, polymerized in the polymer molecule, at least about 85 weight percent of acrylonitrile with at least one other ethylenically unsaturated monomer that is copolymerizable with acrylonitrile may, beneficially, be utilized. The acrylonitrile polymer employed is, of course, soluble in an aqueous saline solvent for acrylonitrile which, usually, has therein at least about 50–60 weight percent of zinc chloride or its saline equivalents. U.S. 2,776,946, among many other reference sources, sets forth many of the monomers which may be copolymerized or interpolymerized with acrylonitrile to produce binary or ternary acrylonitrile copolymers that are useful in the practice of this invention.

The polyepihalohydrins employed in the invention are those materials having terminal hydroxyl groups and halomethyl side chains, which are further characterized by having an average molecular weight of less than about 1200, and a viscosity at 100° F. ranging from about 300 to about 4000 centistokes, and which are essentially devoid of functional epoxy groups.

It is pointed out that the polyepihalohydrins of the present invention are well known materials produced by the polymerization of epichlorhydrin or epibromohydrin. Such polymerization is initiated by traces of water, glycerol chlorohydrin or other polyfunctional compounds which are either incidentlly present in the epihalohydrin or are deliberately added for the purpose. The resulting polymer may be represented by the formula

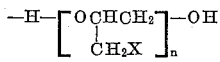

wherein X is chlorine or bromine and $n$ is an integer of a value necessary to provide materials of the hereinbefore defined molecular weight and viscosity.

Specific polyepihalohydrins that are useful for the instant purposes include, but are not restricted to, polyepichlorhydrin having an average molecular weight of about 450, and a viscosity at 100° F. of about 350 centistokes; polyepichlorohydrin having an average molecular weight of about 900 and a viscosity at 100° F. of about 2395 centistokes; polyepichlorhydrin having an average molecular weight of about 1150 and a viscosity at 100° F. of about 3650 centistokes, and polyepibromohydrin having a viscosity at 100° F. of about 921 centistokes.

Ordinarily, water-insoluble polyepichlorhydrins and polyepibromohydrins having a viscosity at 100° F. between about 300 and 4000 centistokes are suitable.

The polyepihalohydrin used in the present invention must be present in the polymer solution in a minimum amount of about 5 weight percent, based on the weight of the acrylonitrile polymer. The permissible maximum proportion depends on the particular polyepihalohydrin being employed and the limit of its compatibility with the aqueous saline polymer solution, as well as the polymeric material contained therein. The maximum limit is generally about 25 weight percent, based on the weight of the acrylonitrile polymer. The amount of polyepihalohydrin present in shaped articles produced from salt-spun acrylonitrile polymers is dependent upon, and in the same ratio as, the amounts of said polyepihalohydrin incorporated in the spinning solution.

It has been observed that the polyepihalohydrins of the type described herein, but having a viscosity at 100° F. less than about 300 centistokes, do not provide sufficient permanent flexibility to shaped articles produced from salt-spun acrylonitrile polymers. Additionally, such polyepihalohydrins having a molecular weight greater than about 1200 or a viscosity at 100° F. of greater than about 4000 centistokes have limited compatibility with the saline solvent solution and the polymeric materials contained therein, and, as a consequence, do not sufficiently plasticize articles produced therefrom.

Further, it is well known that the polyepihalohydrins, as described herein, may be dehydrohalogenated to form polymeric materials containing functional epoxy groups. It has been found, however, that such materials are not preferred for the purposes of the present invention, due to the oftentimes uncontrollable cleavage of the epoxy groups when subjected to the strongly acidic polymer containing spinning solution.

It is also pointed out that the polyepihalohydrins, as defined herein, may be polymerized by addition of the required epihalohydrin to the polymer containing spinning bath. Such method is not desirable, however, due to the extreme difficulty in controlling such polymerization to obtain polyepihalohydrins having the required viscosity and/or molecular weights.

The following example wherein all parts and percentages are to be taken by weight serves to illustrate the present invention but is not to be construed as limiting its scope.

EXAMPLE I

In each of a series of experiments, separate charges of about 35 grams of a solution consisting of 10 percent polyacrylonitrile, 54 percent zinc chloride, and 36 percent water, all based on the total weight of the solution, were placed in each of a series of bottles. Varying percentages of a substantially water-insoluble polyepichlorhydrin having an average molecular weight of about 1150, and a viscosity at 100° F. of about 3650 centistokes (prepared by polymerizing epichlorohydrin in the presence of small amounts of propylene glycol, using $BF_3$ etherate as a catalyst) were individually added to the individual samples with stirring until a homogeneous dispersion was in each case obtained.

The resulting individual samples were placed in a standard laboratory oven maintained at a temperature of about 80° C. until the mixtures were free from bubbles. Films less than about 0.10 inch thick were cast from each of the resulting spinning solutions on "Pyrex" glass plates using a stainless steel drawbar. The resulting films were coagulated by holding the coated plate in a stream of water at ambient temperature.

Within 1 or 2 minutes after casting, the films were detached from the glass plates and thoroughly water washed until free from zinc chloride.

The films prepared in this manner were aquagels which were each then oriented by stretching while immersed in an aqueous medium at a temperature of at least 65° C. Plasticizing was preliminarily indicated in each case when a material could be drawn with less force than required for an equivalent but untreated material (the same cross section and with the same temperature).

Flexibility of each dried film was determined by drying sections thereof which had been drawn to 10 times their original length in a hot aqueous medium, as above described. Each of the dried films were then bent over itself normal to the direction of orientation.

Rating of film flexibility was by visual inspection. Films which gave no perceptible shattering upon bending were rated "excellent," whereas films which shattered noticeably upon bending were rated "poor." Flexibility ratings for plasticized and untreated polyacrylonitrile films and operable additive concentrations of the polyepichlorohydrin as described herein are set forth in the following Table 1:

Table 1

| Percent Polyepichlorohydrin Based on Polymer Weight | Description of Polyepichlorohydrin | Flexibility of Dried Film |
|---|---|---|
| None | | Poor. |
| 5 | Viscous Liquid | Excellent. |
| 10 | do | Do. |
| 25 | do | Do. |

Similar desirable plasticizing efficiency is obtained using any concentration between about 5 weight percent to 25 weight percent of polymer weight of at least one substantially water-insoluble polyepihalohydrin, as hereinbefore defined, each such polyepihalohydrin having an average molecular weight of less than about 1200, and a viscosity at 100° F. ranging from about 300 to about 400 centistokes.

Additionally, equally good results are obtained when fiber or film-forming acrylonitrile polymers containing at least 85 weight percent of polymerized acrylonitrile and and up to 15 weight percent of one or more such copolymerizable materials as vinyl chloride, vinyl acetate, methyl and other alkyl acrylates or methacrylates, the vinyl pyridines, allyl alcohol, and many others well known to those skilled in the art are admixed with the polyepihalohydrins suitable for use in practice of the present invention.

As a means of comparison, it has been observed that polyepihalohydrins, as hereinbefore defined, having a viscosity greater than about 4000 centistokes at 100° F., are not sufficiently compatible with the fiber-forming acrylonitrile polymers to adequately plasticize the same. Further, polyepihalohydrins having a viscosity of less than about 300 centistokes at 100° F. (including monomeric epichlorhydrin or epibromohydrin and dimers and trimers thereof) are easily removed from the fiber-forming acrylonitrile polymer by water washing such polymer or articles produced therefrom, and do not provide the required permanent plasticization.

What is claimed is:

1. In the process of producing articles from a spinning solution of a fiber-forming polymer of acrylonitrile selected from the group consisting of polyacrylonitrile and interpolymers of acrylonitrile containing in the polymer molecule at least about 85 weight percent of acrylonitrile, the balance being at least one other monoethylenically unsaturated monomeric material that is copolymerizable with acrylonitrile, which polymer is dissolved as a spinnable composition in an aqueous saline solvent for said fiber-forming polymer: the step of dissolving in said spinning solution prior to spinning articles therefrom between about 5 and 25 weight percent, based on the polymer weight in said spinning solution, of an essentially water-insoluble polyepihalohydrin of the formula

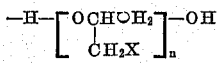

wherein X is selected from the group consisting of chlorine and bromine and n is an integer of a value sufficient to provide an average molecular weight of between about 450 and 1200 and a viscosity at 100° F. between about 300 to 4000 centistokes.

2. The process of claim 1, wherein said aqueous saline solvent is a solution of zinc chloride.

3. The process of claim 2, wherein said polyepihalohydrin is polyepichlorohydrin having an average molecular weight of about 1150 and a viscosity at 100° F. of about 3650 centistokes.

4. The process of claim 2, wherein said polyepihalohydrin is polychlorohydrin having an average molecular weight of about 900 and a viscosity at 100° F. of about 2395 centistokes.

5. The process of claim 2, wherein said polyepihalohydrin is polyepichlorohydrin having an average molecular weight of about 450 and a viscosity at 100° F. of about 350 centistokes.

6. The process of claim 2, wherein said polyepihalohydrin is polyepibromohydrin having a viscosity at 100° F. of about 921 centistokes.

References Cited by the Examiner

UNITED STATES PATENTS 2,648,646    8/1953    Stanton et al. _____ 260—29.6

FOREIGN PATENTS 477,843    1/1938    Great Britain.

MURRAY TILLMAN, *Primary Examiner.*

W. J. BRIGGS, Sr., *Assistant Examiner.*